Dec. 9, 1958 P. A. M. GELL ET AL 2,863,932
METHOD OF AND FURNACE FOR MELTING OR REFINING GLASS
Filed Nov. 6, 1956 4 Sheets-Sheet 1

INVENTORS
Philip Anthony Maunsell Gell
Douglas Graeme Hair
BY A. John Michel
ATTORNEY Dec. 9, 1958  P. A. M. GELL ET AL  2,863,932
METHOD OF AND FURNACE FOR MELTING OR REFINING GLASS
Filed Nov. 6, 1956  4 Sheets-Sheet 3

INVENTORS
Philip Anthony Maunsell Gell
Douglas Graeme Hann
BY A. John Michel
ATTORNEY

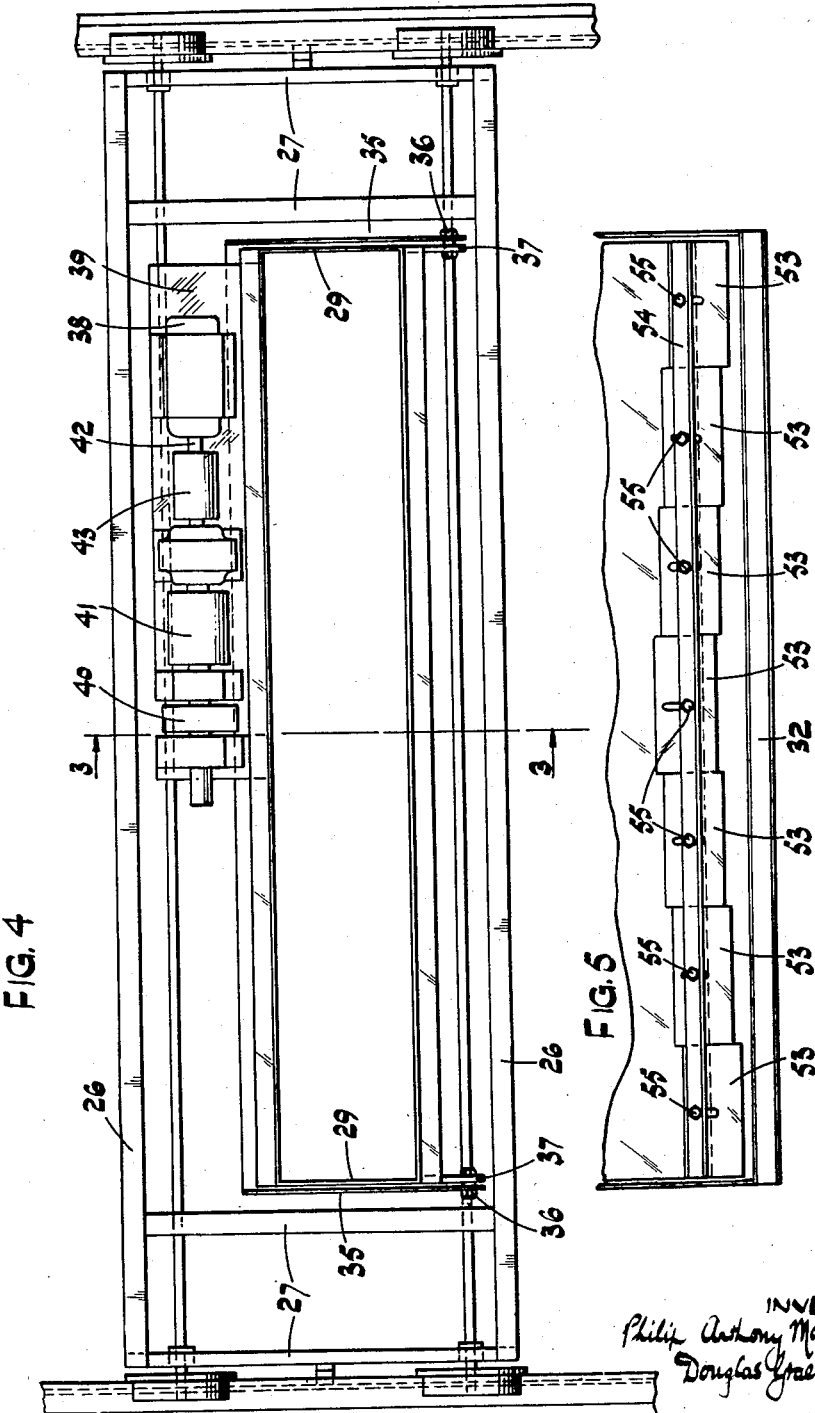

United States Patent Office 2,863,932
Patented Dec. 9, 1958

2,863,932

METHOD OF AND FURNACE FOR MELTING OR REFINING GLASS

Philip Anthony Maunsell Gell, Caynton, near Shifnal, and Douglas Graeme Hann, Beckbury, near Shifnal, England, assignors to Elemelt Limited, Bilston, England, a British company Application November 6, 1956, Serial No. 620,619

8 Claims. (Cl. 13—6)

The invention relates to a method of and furnace for melting or refining glass (which term is to be deemed to include vitreous materials generally) wherein the melt of glass is contained within a furnace chamber and is heated by the passage of electric current through the melt. The invention also relates to a furnace for melting or refining glass for carrying out this method.

In order to carry out this method efficiently it is necessary to reduce so far as possible heat loss from the glass melt, but some heat loss is inevitable, through the walls of the furnace chamber and from the upper surface of the glass melt and thence through the crown of the furnace chamber when a crown is provided.

In practice we have found that a large part of this heat loss does in fact occur from the upper surface of the glass melt and our present invention is directed to reducing this.

One object of the present invention is to reduce this heat loss in a simple and effective manner which also provides extensive contact between batch materials in the form of powdered or divided solids and glass which is already molten in order to promote conditions of operation in the furnace which are conducive to satisfactory melting or refining.

A further object of the invention is to avoid undue wear on the inner walls of a furnace chamber by the abrasive action of solid batch materials fed into the chamber and thereby prolong the life of the furnace.

With these objects in view and in accordance with the invention the method of melting or refining glass by the passage through the melt of an electric current whilst the melt is contained in a furnace chamber is characterised in that glass batch materials in the form of powdered or divided solids are fed onto the upper surface of the melt to form a heat conserving batch crust extending over substantially the whole of said upper surface leaving only a relatively narrow margin at the boundaries of this surface, in which margin the surface layers consist of molten or partly molten glass with not more than a thin layer, if any, of said batch materials in solid form so that the batch crust as a whole floats freely on the surface of the melt and is not significantly impeded in rising or falling by contact with the walls of the furnace chamber with the surface of the melt if the level thereof fluctuates.

In carrying out this method the glass in the margin may be maintained in the molten or partly molten state by creating in the space above such margin a local temperature environment which is higher than that maintained above the batch crust.

Further according to the invention a glass melting or refining furnace of the kind comprising a furnace chamber for containing the glass melt and having opposed electrodes or sets thereof for passing electric current through the melt to heat it to the required temperature is characterised in that means are provided above the normal surface of the melt for establishment at or above a relatively narrow margin of the surface of the melt at the boundary thereof a temperature environment which is higher than that obtaining above the main centrally disposed portion of such surface so that whilst a heat conserving batch crust can be maintained on said main centrally disposed portion of said surface the surface layers of glass in said margin are molten or partly molten.

A simple and effective means for attaining this higher temperature environment comprises the heat barrier members projecting inwardly from the side and end walls of the furnace chamber at or above the normal surface level of the melt so as to overlie same.

The invention is illustrated in the accompanying drawings wherein:

Figure 4 is a fragmentary plan view showing the charging device, and

Figure 5 is a fragmentary view in end elevation of the lower portion of the front wall of the charging device.

Figure 1:
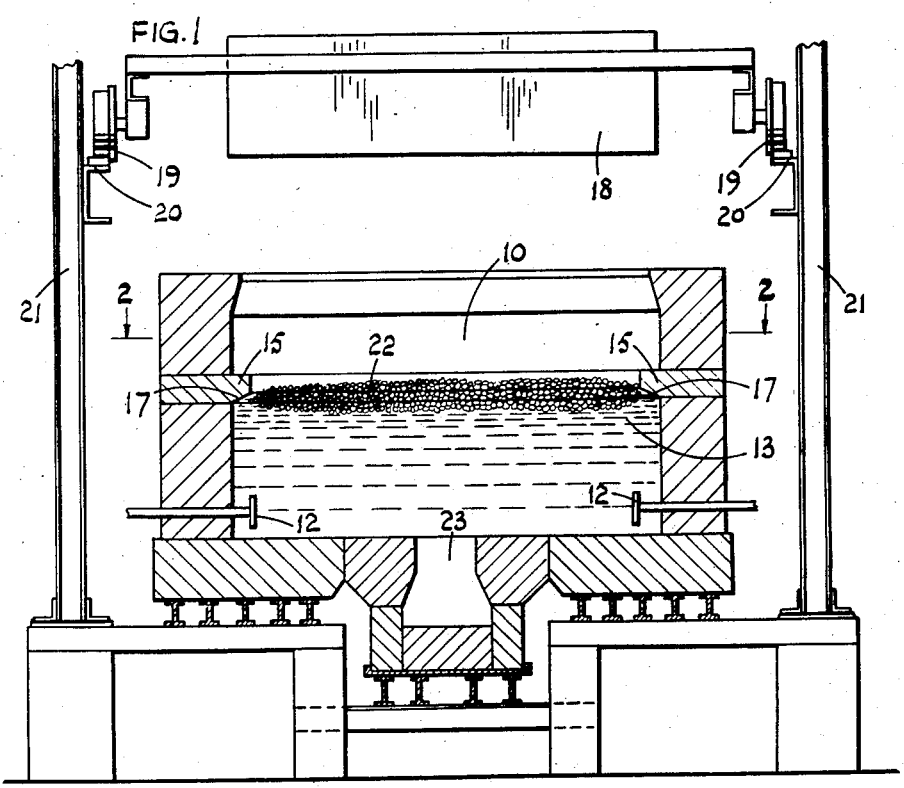
Figure 1 shows in end elevation and partly in cross section one construction of glass melting or refining furnace in accordance with the invention for carrying out the method thereof.

In the construction of furnace illustrated the furnace comprises a furnace chamber 10 for conducting melting or refining of glass. As seen in plan this chamber may be of square, or rectangular, but approximately square form, the height of the chamber being determined by the volume of glass melt which is required to be present in the chamber 10 to satisfy both the requirements of through-put (i. e. weight of glass to be delivered from the furnace in a given time) and melting or refining duration (i. e. the length of time which the glass must remain in the chamber in order to be melted or refined to a satisfactory degree). Typical dimensions given by way of example are: width 8 ft., length 9 ft., and height 2 ft. 6 inches.

Along each of the end walls 11 of the chamber 10 are disposed electrodes 12 which may be constructed as described in copending patent application No. 608,092, filed September 5, 1956, in the name of Douglas Graeme Hann.

These electrodes as illustrated are preferably disposed closely adjacent to the end walls 11 of the furnace and occupy nearly the whole width and a substantial depth of the portions of these end walls disposed below the normal surface level of the glass melt in the furnace, which level is indicated at 13. Current is thus communicated into the glass from these electrodes from a suitable alternating current source over substantially the whole cross section of the melt taken in a vertical plane parallel to the end walls 11.

The end walls 11 and the side walls 14 of the furnace chamber may be constructed of any suitable refractory material such for example as sintered sillimanite or electro-cast zircon mixture. At a short distance above the normal surface level 13 of the glass melt the end walls and the side walls include blocks which project inwardly of the furnace chamber to form sills 15 along the whole length of the end walls 11 and sills 16 along the whole length of the side walls 14.

The blocks which form these sills may be formed of the same refractory material as is used for the construction of the walls in which they are included and preferably the blocks are dimensioned so that they project inwardly beyond the inner surfaces of the walls 11 and 14, which surfaces are vertical or substantially so, by a distance of about 6 inches.

It will be understood that this distance by which the blocks project may be reduced or increased to some extent without in the first case unduly prejudicing the establishment of a higher temperature zone within the chamber beneath the sills of the requisite width to produce liquefaction of batch materials in this zone as hereinafter described, and without in the second case prejudicing the laying of a crust of batch material over substantially the whole surface of the glass melt which is desirable to reduce loss of heat upwardly from the furnace chamber so far as possible. In general the sills should project by a minimum distance of 3 inches and should not project by more than 9 inches.

It will be observed that the under surfaces 17 of the sills 15 are inclined to the horizontal plane so that they extend upwardly in a direction away from the end walls of the furnace, and it will be understood that the under surface of the sills 16 are inclined in a like manner.

This inclination of the under surface promotes reflection of radiated heat downwardly by these under surfaces into the marginal zone lying beneath the sills, the radiation originating from portions of the glass melt situated inwardly of the sills, that is to say nearer the centre of the chamber where the temperature is in general somewhat higher.

If the under surfaces of the sills were horizontal the heat reflected downwardly thereby would originate mainly from the zone disposed beneath the sills themselves. While this arrangement would be effective in practice the construction illustrated is preferred.

In addition to promoting the maintenance of a temperature environment above the marginal portion of the glass melt at its boundary by virtue of reflection of radiated heat from the under surfaces, these sills also promote the establishment of this higher temperature environment inasmuch as they act as physical barriers against upward transmission of heat from the surface of the glass melt beneath the sills by convection.

Figure 2:
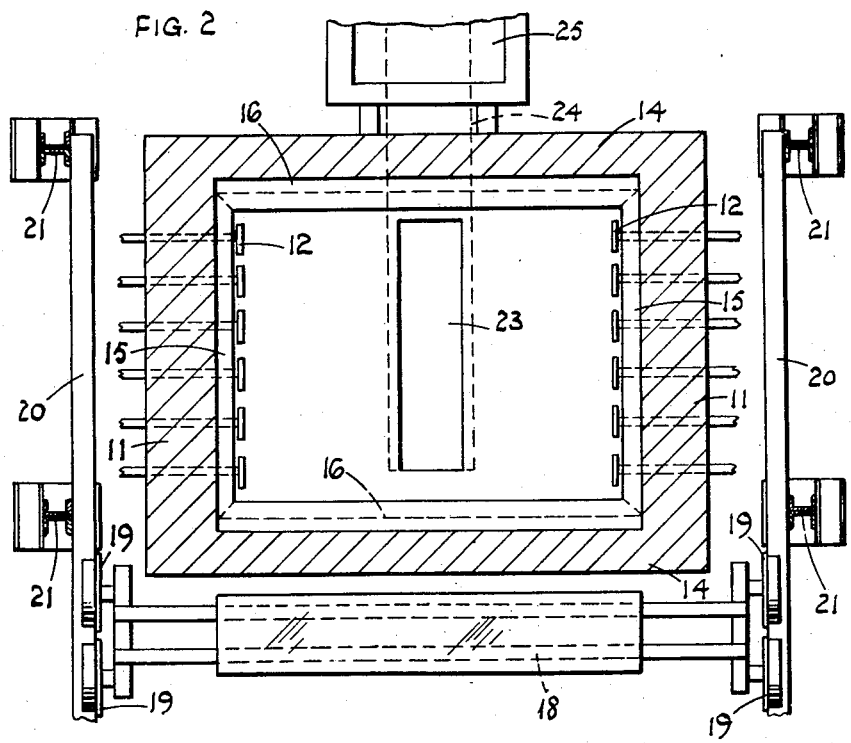
Figure 2 is a plan view, the furnace chamber being shown in cross section on the line 2—2 of Figure 1.

For feeding batch materials to the furnace chamber 10 in a manner such that they are discharged as may be required in any particular case over the surface 13 of the glass melt a charging device is provided, the details of construction of which are not shown in Figures 1 and 2, this charging device being indicated therein generally at 18. The charging device is provided with wheels 19 running on horizontal rails 20 supported by uprights 21 outside the end walls of the furnace.

Figure 3:
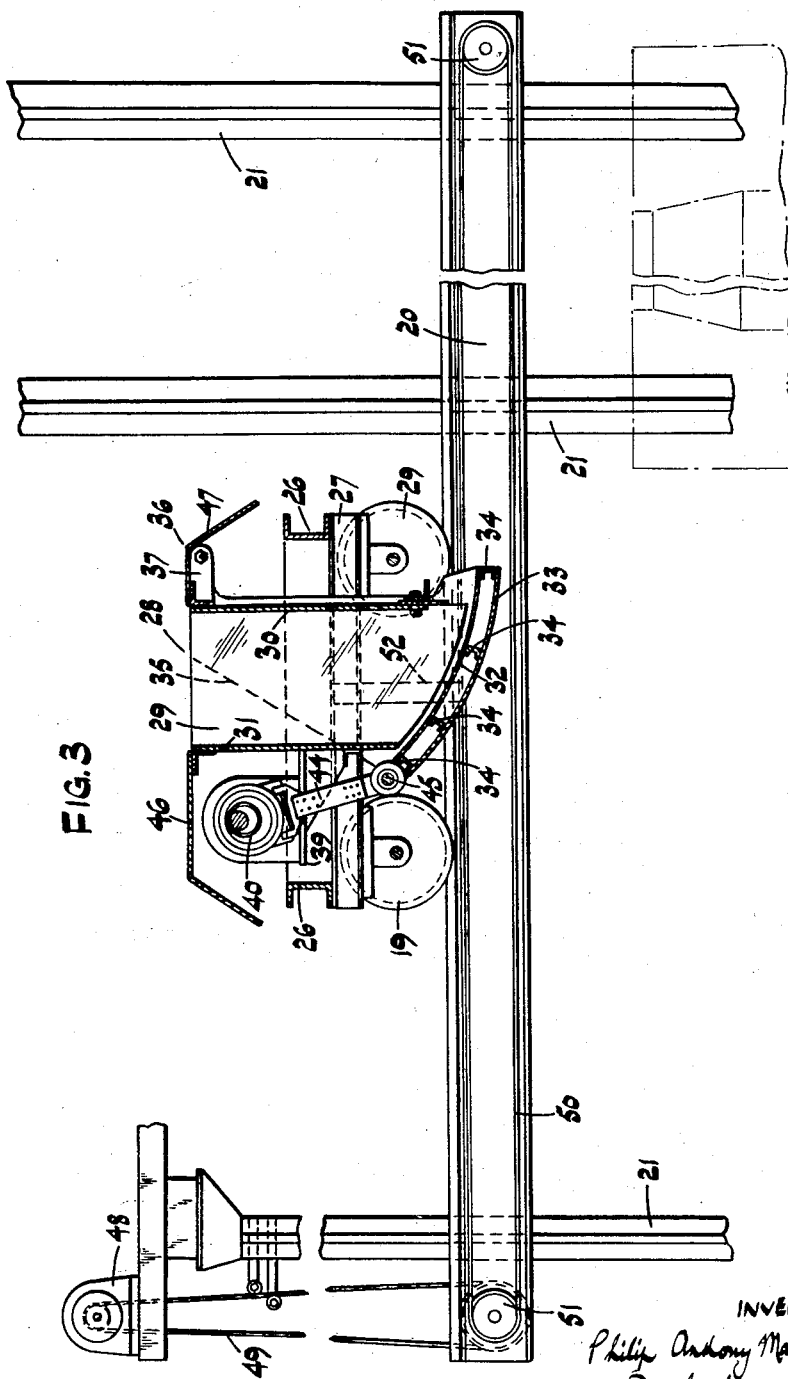
Figure 3 is a view in side elevation showing in vertical cross section on the line 3—3 of Figure 4 the construction of the charging device.

The charging device is illustrated in more detail in Figures 3, 4 and 5. The charging device may comprise a rectangular frame constructed of suitable girders 26 and 27 within which is mounted a container 28, the whole in combination with the wheels 19 forming a carriage which can run on the horizontal rails 20.

The container itself may comprise a fixed portion comprising side walls 29, a front wall 30 and a rear wall 31, this fixed portion being suitably supported from the rectangular frame as for example by brackets or by being welded thereto.

The fixed portion of the container is open at its top and at its bottom. Beneath the open bottom of the fixed portion of the container is disposed a movable base 32 preferably of arcuate form as seen in side elevation and comprising a pair of spaced parallel plates 33 between which are disposed transverse girders 34 to which such plates may be welded.

The base may be provided with upwardly extending side plates 35 along each of its lateral edges, these plates being pivoted at their upper ends as indicated at 36 to brackets 37 projecting forwardly from the front wall 30 of the container.

Where it passes beneath the lower edge of the front wall 30 the base is spaced below such edge to provide a discharge outlet which extends for the entire width of the container.

The base member 32 is arranged to be rocked to and fro about the pivotal axis 36 so as to cause that part of the base member which normally lies in advance of the front wall 30 to be withdrawn rearwardly for an appropriate distance, thereby causing batch material to be discharged from the outlet. For example the amplitude of the rocking movement may be such that the forward edge of the base member is withdrawn to a position where it is in the same vertical plane as the front wall 30 or is just behind this plane. Greater amplitudes of movement are effective to produce a greater rate of discharge for each oscillation of the base member, or alternatively a greater rate of discharge may be obtained by increasing the frequency of oscillation whilst maintaining the amplitude of oscillation at a fixed value.

For effecting such oscillation a motor 38 is provided on a suitable platform 39 secured to the rear wall of the carriage, this motor driving a variable throw eccentric 40 through the intermediary of a gear box 41 to which the shaft 42 of the motor is connected through a coupling 43.

The eccentric 40 has an arm 44 pivotally connected at 45 to the base 33 at or near its rearward edge.

The container is provided at its upper end with cover plates 46 and 47 extending over the frame.

For moving the carriage from a loading station as shown in Figure 3 to an operative station over the furnace chamber traction means are provided which may comprise an electric motor 48 mounted on a suitable part of the supporting structure at the loading zone, this motor driving through the intermediary of a sprocket chain 49 a pair of sprocket chains 50 passing over sprocket wheels 51 at opposite ends of the horizontal rails 20 the carriage being connected to the upper run of each of these sprocket chains 50 by a downwardly extending arm 52.

To permit the lateral distribution of batch material effected in a zone spanning the length of the furnace chamber and extending over the surface of the glass melt to be varied the lower edge of the front wall of the container has secured thereto a plurality of vertically adjustable plates 53 which may be set to provide gaps of varying height between their lower edges and the base 32 of the container, each plate being capable of being secured in an adjusted position by clamping means such as a transversely extending girder 54 through which extend bolts 55 also passing through vertical slots in the plates 53.

It will be understood that by virtue of movement of the carriage through the operative station batch materials are deposited in a succession of zones spanning the surface of the melt lengthwise of the furnace chamber so as to cover substantially the whole surface of the melt with a crust 21 of batch materials.

The length of the opening provided in the charging carriage for the distribution of batch material may be such that in general batch material is not delivered on to the tops of the sills 15 but is delivered across substantially the whole length of the chamber between the inner edges of the opposing sills 15 and similarly the whole width of the furnace chamber between the opposed edges of the sills 16.

Any lateral spread of the batch crust into the zones beneath the sills 15 and 16 is counteracted by the fact that liquefaction of the batch materials in these zones takes place more quickly than in portions of the batch crust situated inwardly of the inner edges of the sills so that at or closely adjacent to the inner surfaces of the walls 11 and 14 beneath the sills the materials present in the furnace chamber consist only of molten glass or glass which is nearly molten.

Owing to this effect the batch crust can rise and fall freely on the surface 13 of the glass melt as the level thereof fluctuates according to the rate of through-put.

By providing a floating batch crust over almost the entire surface of the melt extensive thermal communication is established between the under surface of the batch crust and the glass melt, whereby a high rate of liquefaction of batch materials is promoted, whilst at the same time owing to the somewhat porous structure which obtains particularly in the lower layers of the batch crust which are in an intermediate condition between the solid and liquid state and contain pockets or voids the batch crust acts as an effective heat conservation device.

The presence of the sills avoids excessive abrasion of the inner surfaces of the side and end walls of the furnace chamber which would take place were abrasive quantities of solid batch materials to remain in contact therewith whilst undergoing vertical movement due to the changing level of the surface 13 of the melt. Furthermore mechanical contact between such batch making materials in solid form and the inner surfaces of the side and end walls might break up and disrupt the batch crust in the marginal zone at the boundary of the melt and interfere with the more or less steady and progressive liquefaction which is a characteristic feature of the method and furnace of the present invention.

The risk of undue lack of homogeneity in portions of the glass melt at or near the marginal zone due to break up of the batch crust, and premature precipitation of newly delivered batch materials into the melt is therefore avoided or reduced in addition to the other beneficial effects mentioned above.

During operation of the furnace the surface level of the glass melting may be coincident with or even above the highest parts of the undersurfaces of the sills without prejudice to performance of their function or the level may fluctuate so that it is sometimes below and sometimes above these parts of the sills.

Glass may be withdrawn from the furnace chamber 10 through a slot or opening 23 in the bottom wall of the furnace situated midway between the electrodes, this glass then passing along a duct 24 for entry into a further chamber 25 through an opening in the bottom wall thereof, a fragment of the further chamber being shown in Figure 2.

The dimensions of the slot 23 and the arrangement for supplying auxiliary heat to the glass in the duct 24 and in the further chamber 25 may be as described and claimed in copending application Ser. No. 620,618 filed on the same date as the present application.

What we claim then is:

1. In a glass melting furnace comprising a furnace chamber having side and end and bottom walls for containing a body of glass melt, and spaced opposed electrodes for passing an electric current through the melt to heat it to the required temperature; the provision in combination of means for depositing glass batch materials in divided solid form onto the upper surface of the glass melt in a succession of zones spanning said surface so as to cover substantially the whole area of said surface with a crust of said materials, and, means for shielding physically and thermally a relatively narrow margin of said upper surface at the boundaries thereof from deposition of said materials and from heat loss from said surface, whereby while said batch crust is maintained in being above a main centrally disposed portion of said upper surface to conserve heat in the glass melt surfaces, layers of glass in said margin are maintained at least partly molten.

2. In a glass melting furnace comprising a furnace chamber having side and end and bottom walls for containing a body of glass melt, and spaced opposed electrodes for passing an electric current through the melt to heat it to the required temperature; the provision in combination of a charging device comprising a horizontal guide structure, a carriage for containing and distributing glass batch materials in divided solid form and movable along said guide structure over said furnace chamber to distribute said materials onto the upper surface of the glass melt over substantially the whole area of said upper surface to form a batch crust, and heat barrier members projecting inwardly from side and end walls of said furnace chamber in the region of the normal surface level of the glass melt, said heat barrier members being relatively narrow to establish at a relatively narrow margin of said upper surface at the boundaries thereof a temperature environment higher than that obtaining above said batch crust whereby while said batch crust is maintained in being above a main centrally disposed portion of said upper surface to conserve heat in the glass melt surface layers of glass in said margin are maintained at least partly molten.

3. In a glass melting furnace comprising a furnace chamber having side and end and bottom walls for containing a body of glass melt, and spaced opposed electrodes for passing an electric current through the melt to heat it to the required temperature; the provision in combination of means for depositing glass batch materials in divided solid form onto the upper surface of the glass melt in a succession of zones spanning said surface so as to cover substantially the whole area of said surface with a crust of said materials, and sills of refractory material projecting inwardly from said side and end walls of said furnace chamber, said side and end walls beneath said sills having substantially vertical inner surfaces, and said sills having a width which is small in relation to the length and width of the furnace chamber and having under surfaces which extend over and are opposed to a marginal portion of the upper surface of the glass melt at the boundaries thereof at a vertical spacing of up to six inches.

4. In a glass melting furnace comprising a furnace chamber having side and end and bottom walls for containing a body of glass melt, and spaced opposed electrodes for passing an electric current through the melt to heat it to the required temperature; the provision in combination of means for depositing glass batch materials in divided solid form onto the upper surface of the glass melt in a succession of zones spanning said surface so as to cover substantially the whole area of said surface with a batch crust, and sills of refractory material projecting inwardly from said side and end walls of said furnace chamber, for a horizontal distance in the range one inch to nine inches, said side and end walls beneath said sills having substantially vertical inner surfaces, and said sills having under surfaces which extend over and are opposed to a marginal portion of the upper surface of the glass melt at the boundaries thereof at a vertical spacing of up to six inches.

5. In a glass melting furnace comprising a furnace chamber having side and end and bottom walls for containing a body of glass melt, and spaced opposed electrodes for passing an electric current through the melt to heat it to the required temperature; the provision in combination of means for depositing glass batch materials in divided solid form onto the upper surface of the glass melt in a succession of zones spanning said surface so as to cover substantially the whole area of said upper surface with a batch crust, and sills of refractory material projecting inwardly from said side and end walls of said furnace chamber, said side and end walls beneath said sills having substantially vertical inner surfaces, and said sills having a width which is small in relation to the length and width of the furnace chamber and having under surfaces which are inclined in an upward direction from their outer boundaries adjacent to said side and end walls towards their inner boundaries.

6. In a glass melting furnace comprising a furnace chamber having side and end and bottom walls for containing a body of glass melt, and spaced opposed electrodes for passing an electric current through the melt to heat it to the required temperature, the provision in combination of means for feeding glass batch materials in divided solid form onto the upper surface of the glass melt comprising a charging device disposed above the top of the furnace chamber and movable into and through an operative charging zone above said chamber, such charging device comprising a container for said batch materials and mechanism for discharging said materials at a controlled discharge rate from an outlet extending transversely of the direction of movement of said charging device, and gate means in association with said outlet to control the rate of discharge at different positions along the length of said outlet so that said batch materials are discharged onto the upper surface of the glass melt over substantially the whole area of said upper surface but with a distribution determined by said gate means so as to form a batch crust of predetermined thickness; and, means for establishing at a relatively narrow margin of said upper surface of the glass melt at the boundaries thereof a temperature environment higher than that obtaining above said batch crust.

7. A method of melting glass comprising, heating a body of glass melt by passing an alternating electric current through it while said melt is contained in a furnace chamber, promoting extensive contact between glass batch materials and said melt by distributing said materials over substantially the whole of the upper surface of said melt, and preventing distribution of said materials onto a relatively narrow margin at the boundaries of said surface while also maintaining said melt in liquid form at its surface within said margin by disposing above said surface a barrier to distribution of said material onto, and to loss of heat from, said surface within said margin.

8. A method of melting glass comprising, heating a body of glass melt by passing an alternating electric current through it while said melt is contained in a furnace chamber, depositing glass batch materials onto the upper surface of said melt in a succession of zones each spanning said surface so as to cover substantially the whole of said surface with a crust of said materials, and preventing deposition of said materials onto a relatively narrow margin at the boundaries of said surface, by physically and thermally shielding said margin with an overlying barrier member.

References Cited in the file of this patent

UNITED STATES PATENTS

| | | |
|---|---|---|
| 972,778 | Sauvageon | Oct. 11, 1910 |
| 1,201,664 | Williams | Oct. 17, 1916 |
| 1,880,540 | Wadman | Oct. 11, 1932 |
| 2,263,848 | Keaney | Nov. 25, 1941 |
| 2,281,408 | Borel | Apr. 28, 1942 |
| 2,636,913 | Lambert | Apr. 28, 1953 |